United States Patent [19]

Shimamura et al.

[11] Patent Number: 4,972,595
[45] Date of Patent: Nov. 27, 1990

[54] INCLINATION SENSOR

[75] Inventors: Koichi Shimamura, Mitaka; Takao Yamamoto, Fujimi; Tetsuo Yamagata, Tokyo, all of Japan

[73] Assignee: Honda Giken Kogyo Kabushiki Kaisha, Tokyo, Japan

[21] Appl. No.: 314,640

[22] Filed: Feb. 23, 1989

[30] Foreign Application Priority Data

Feb. 25, 1988 [JP] Japan ................... 63-24688

[51] Int. Cl.⁵ ...................... G01C 9/10; G01C 9/6
[52] U.S. Cl. ........................ 33/366; 33/365; 116/215
[58] Field of Search ............ 33/365, 366; 116/215; 200/61.45 R, 61.52; 340/689; 123/510

[56] References Cited

U.S. PATENT DOCUMENTS

| | | |
|---|---|---|
| 685,569 | 10/1901 | Bullard .................. 33/365 |
| 2,168,885 | 8/1939 | Rickenbach et al. .......... 33/365 |
| 2,794,084 | 5/1957 | Segoni ................... 340/689 |
| 3,774,314 | 11/1973 | Youngs .................... 33/365 |
| 4,438,720 | 3/1984 | Conn ...................... 33/365 |
| 4,450,353 | 5/1984 | Sjolund ................... 33/366 |
| 4,514,908 | 5/1985 | Yamaguchi ................ 33/365 |
| 4,556,799 | 12/1985 | Rolando .................. 33/366 |
| 4,628,612 | 12/1986 | Hori et al. ............... 33/366 |

FOREIGN PATENT DOCUMENTS

| | | | |
|---|---|---|---|
| 2587796 | 3/1987 | France .................. 33/365 |
| 0049214 | 3/1985 | Japan ................... 33/365 |
| 0142414 | 6/1986 | Japan ................... 33/365 |
| 0155913 | 7/1986 | Japan ................... 33/365 |
| 0401545 | 6/1962 | Switzerland ............. 33/366 |
| 2072838 | 10/1981 | United Kingdom ......... 33/365 |

Primary Examiner—William A. Cuchlinski, Jr.
Assistant Examiner—Christopher W. Fulton

[57] ABSTRACT

An inclination sensor is contemplated which includes case means having a cavity formed in the interior thereof, with this cavity having a longitudinal slope which is generally V-shaped in longitudinal profile, downwardly concave, and having a downwardly facing apex. A movable member is movable longitudinally along the slope within said cavity. A detecting means is operable to detect the inclination of a mounting body to which said case means is attached, in response to longitudinal movement of the movable member along the longitudinal generally V-shaped slope. A restricting means is provided by the apex and is operable to impede movement of the movable member out of the apex only until the case means undergoes a predetermined, longitudinal tilting movement.

5 Claims, 3 Drawing Sheets

INCLINATION SENSOR

The present invention relates to an inclination sensor attached to a mouting body such as, for example, the body of an automobile or a twowheeled vehicle. This sensor functions to detect the state of inclination of the vehicle body.

PRIOR ART

Heretofore, as an inclination sensor of this type, there has been known, for example, an inclination sensor as disclosed in Japanese Utility Model application Laid-Open No. 89165/1976. According to this conventional sensor, a swing member is pivotable about the axis of a rotary shaft. Magnets are disposed at both ends of the sensor in a liquid-filled container. There are provided switches in this device, each adapted to operate in close proximity to the opposed magnet when the swing member swings a predetermined distance.

PROBLEMS SOLVED BY INVENTION

According to prior art constructions, as above noted, it is necessary that the pivoting radius of the swing member be set considerably long in order to attain sufficient sensitivity. In so doing, a limit is encountered in the possible reduction in size of the unit. For example, when the sensor is to be attached to a vehicle body, it is sometimes difficult, due to the size of the unit to mount it onto a circuit board for electrical equipment. Since electrical switches are used as detecting means, so-called chattering is apt to occur due to mere vibrations of the vehicle body, thus causing undesired noises. To eliminate chattering it is necessary to use a special electronic circuit, which leads to increased cost.

The present invention has been developed in view of the above-mentioned problem. It is the object thereof to provide an inclination sensor which is capable of being reduced in size, as compared with conventional sensors, without using electric switches, and which may be readily mounted on and integrated with a circuit board and which is easy to handle.

PRESENT INVENTION

The present invention, has been developed in order to attain the abovementioned objects. The invention is characterized by comprising a case having a cavity formed in the interior thereof, this cavity having a slope which is generally V-shaped in section; i.e. the longitudinal profile. A movable member is movable along this slope within the cavity. A detecting means is provided for detecting the amount of inclination of a mounting body to which the case is attached, according to the movement of the movable member along the V-shaped path or slope.

It is suitable for the mounting body to comprise a vehicle body and desirable for the case to be mounted on a circuit board for electrical equipment of the vehicle.

More suitably, the slope of the cavity has an inclination curve in its base, i.e. downwardly facing apex, which curve provides an inflection point for imparting hysteresis to the movement of the movable member.

It is also suitable to detect the movement of the movable member in an optically responsive, non-contacting manner.

OPERATION OF INVENTION

As the mounting body inclines or tilts beyond a predetermined angle in a longitudinal direction, the movable member in the cavity moves along the V-slope and the detecting portion detects that movement. In this case, if an inflection point is provided at an intermediate point of the slope, there will appear hysteresis in the movement of the movable member when the mounting body inclines and returns. This results in different timings in detecting the movement of the movable member by the detecting portion. Because of this, the occurrence of chattering as encountered in the prior art is prevented.

SUMMARY OF THE INVENTION

The scope of separately significant aspects of the invention is as set forth individually in the appended claims.

Suffice it here to state that a basic aspect of the invention resides in an inclination sensor comprising:
case means having a cavity formed in the interior thereof,
    this cavity having a longitudinal slope which is generally V-shaped in longitudinal profile and downwardly concave;
a movable member which is movable longitudinally along the slope within the cavity; and
a detecting means operable
    to detect the inclination of a mounting body to which the case means is attached,
        in response to longitudinal movement of the movable member along the longitudinal generally V-shaped slope.

DRAWINGS

In describing the invention reference will be made to the appended drawings which illustrate a presently preferred embodiment. This reference is by way of example only, and does not limit the scope of the invention as set forth in the appended claims.

To facilitate the ensuing discussion, frequent reference will be made to the following elements:

| Drawing Reference Number | Element |
| --- | --- |
| 1 | inclination sensor |
| 2 | case |
| 3 | cavity |
| 3a | bottom face, i.e. curved, downwardly facing apex |

-continued

| Drawing Reference Number | Element |
|---|---|
| 3b | end face (slope), i.e. outer sides of V-profile |
| 4 | movable member |
| 7 | light emitting portion (detecting means) |
| 8 | light sensing portion (detecting means) |
| 9 | circuit board (mounting body) |
| C | inflection point |

PRESENTLY PREFERRED EMBODIMENT

Figure 1:
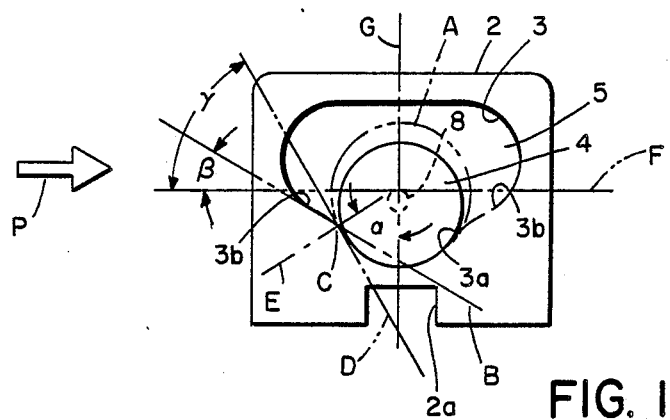
FIG. 1 is a front view showing a schematic construction according to an embodiment of the present invention.

An inclination sensor 1 according to the present invention, is shown in FIG. 1. In the FIG. 1 device, a cavity 3 is formed in a case 2. Case 2 may be formed of an acrylic resin in the shape of a rectangular parallelepiped. A movable member 4 constituted by an opaque, a light-shielding disc, is disposed within the cavity 3. The cavity 3 is formed in a generally triangular shape or longitudinal profile. The case section includes a cover plate facing the movable body 4. The V-shaped slope of the cavity comprises a bottom curved face $3a$ extending along a virtual circle A and end faces $3b$ contiguous to the bottom face and each extending along a straight line B.

The outside diameter of the movable member 4 is smaller than the diameter of the virtual circle A. The angle $\alpha$ between a normal line E, which is perpendicular to a tangent line D of the virtual circle A at a point of contact C of the bottom face $3a$ and each end face $3b$, and a center line (coincident with a vertical line G) extending along the height of the case 2 in an uninclined state, is set larger than the angle $\beta$. Angle $\beta$ extends between the straight line B and the center line H extending in the transverse direction of the case 2 in an uninclined state. Further, the angle $\beta$ is set smaller than the angle $\gamma$ between the tangent line D and the horizontal center line F. The interior of the cavity 3 of the case 2 is filled with a light-transmitting, motion dempening fluid 5 such as silicone oil.

Figure 2:
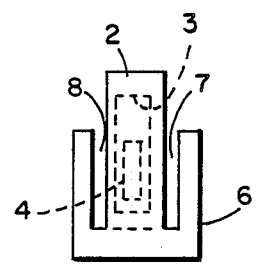
FIG. 2 is a side view as seen in the direction of arrow P in FIG. 1.
Figure 3:
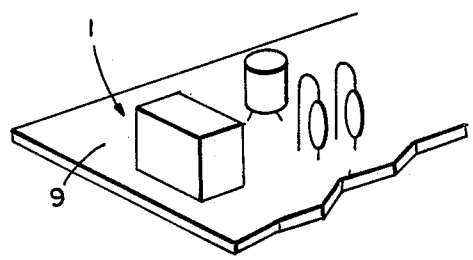
FIG. 3 is a perspective view showing an inclination sensor mounted on a circuit board.

In the inclination sensor 1, as shown in FIG. 2, a holder 6 having an upwardly-open, channel-like section is engaged with a lower cutout or recess $2a$ of the case 2. There is provided a photosensor as the detecting means comprising a light emitting portion 7 and a light sensing portion 8, which are attached to opposed inner surfaces of the two upright leg portions of the holder 6. The photosensor is connected to a conventional alarm circuit (not shown).

The inclination sensor 1 can be formed in a compact shape which is, for example, 25 mm high, 21 mm wide, 6 mm thick and may weigh only about 20 g. Thus, the sensor can be effectively and compactly mounted on a circuit board 9 for electrical equipment in the body of a motorcycle for example.

Figure 4:
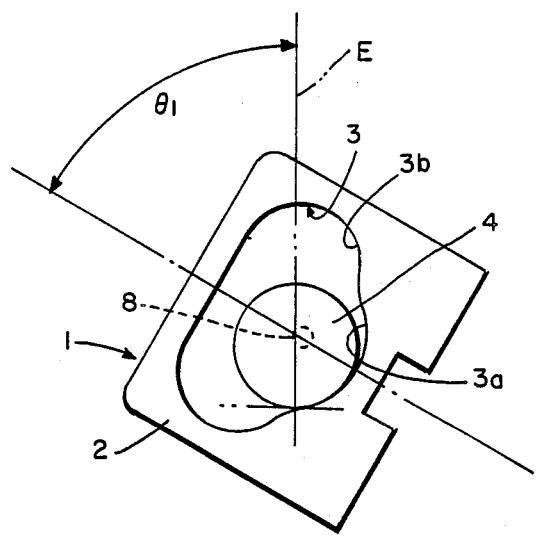
FIG. 4 is a front or plan view showing a movable member just before it goes beyond an inflection point at the time of inclination.

The operation of this embodiment constructed as above will now be described with reference to FIGS. 4 and 5.

In the normal state shown in FIG. 1, the movable member 4 remains stationary in a central, lower apex provided by the bottom face $3a$ of the cavity 3. As the vehicle body begins to incline, the movable member 4 rolls along the bottom face $3a$. As shown in FIG. 4, until the inclination reaches a predetermined angle (e.g. 60° with respect to the vertical line G), that is when the tangent line D becomes approximately horizontal, the movable member will not roll to the end face $3b$ side beyond the contact point C. In this case, therefore, the photosensor remains intercepted or disabled by the movable member 4 and so is in an OFF condition. This impedance to movement is provided by the restraining influence of depressed apex $3a$.

Figure 5:
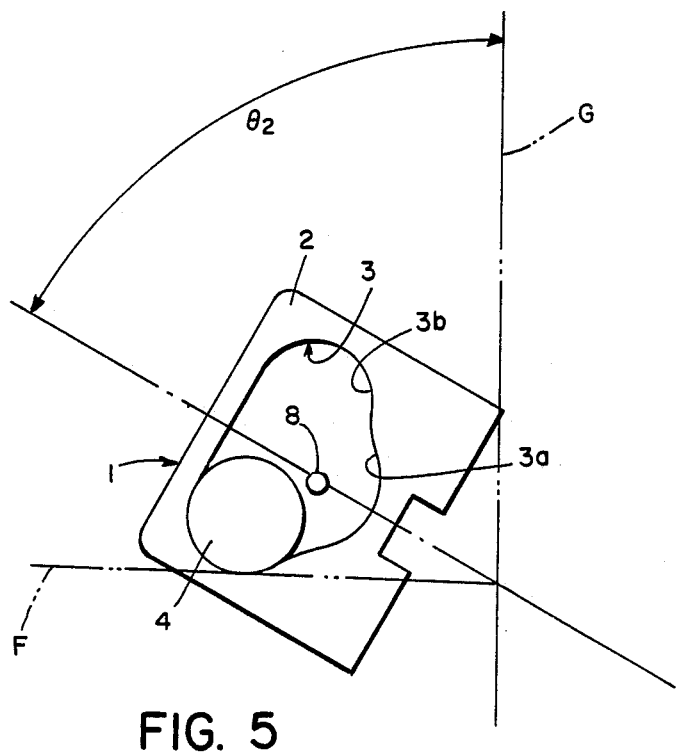
FIG. 5 is a front view showing the movable member just after it goes beyond the inflection point at the time of inclination.

Next, when the vehicle body inclines a predetermined angle (e.g. 62° with respect to the vertical line G), as shown in FIG. 5, the movable member 4 rolls along the end face $3b$, beyond the contact point C and is retained in a corner portion of the cavity 3. In this state, the light emitting portion 7 and the light sensing portion 8 are directly communicating with each other, so that the photosensor turns ON and the alarm circuit, etc. operates.

Figure 6:
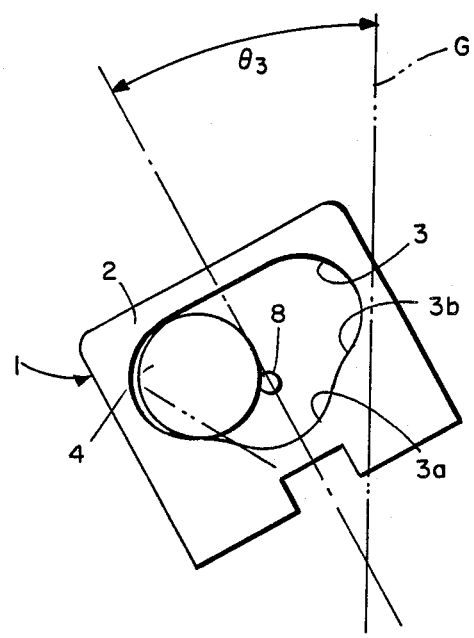
FIG. 6 is a front view showing the movable member just before it goes beyond the inflection point at the time of return from the inclination.

Thereafter, as the vehicle body inclines to return in the original direction, the movable member 4 begins to roll in the opposite direction along the end face $3b$. But, as shown in FIG. 6, until the vehicle body inclines beyond a predetermined angle $\theta_3$ (e.g. 30° with respect to the vertical line G), that is, until the straight line B becomes nearly horizontal, the movable member 4 does not roll to the bottom face $3a$ side beyond the contact point C, so the photosensor keeps ON. Then, when the inclination of the vehicle body returns to an angle inside the angle $\theta_3$, the movable member 4 rolls to the bottom face $3a$ side beyond the contact point C, so the photosensor turns OFF.

Thus, the movement of the movable member 4 along the V slope in the cavity 3 has hysteresis.

BENEFITS OF THE INVENTION

The present invention has the following effects. First, according to the claimed construction, a cavity has a slope generally V-shaped, longitudinal profile formed in the interior of the case, and a movable member is movable along this slope and disposed in the cavity. Further there is provided a detecting means for detecting the amount of inclination of a mounting body to which the case is attached, according to or in response to the movement of the movable member. As a result, all that is required is movement of the movable body along the slope and it is no longer necessary to accomodate a long pivoting radius required in the prior art, so it becomes possible to realize a compact sensor. That is, there can be attained with the claimed construction a small space for mounting the case such as the limited space on a circuit board for electrical equipment in a vehicle body.

Further, according to the claimed construction wherein the inclination curve of the cavity slope has an inflection point for imparting hysteresis to the movement of the movable member, chattering can be prevented easily by way of a purely mechanical construction.

Additionally, according to the claimed construction wherein the detecting portion detects the movement of the movable member in a noncontacting manner, it is possible to prevent the occurrence of noise caused by mechanical contact and separation.

As will be recognized, the direction terminology employed in this discussion is not limiting in relation to the direction of vehicle inclination being monitored.

Moreover, it will be recognized that those skilled in this art and familiar with this disclosure may envision additions, deletions, substitutions, equivalents or other modifications falling within the scope of the invention as set forth in the appended claims.

What is claimed is:

1. An inclination sensor comprising:

case means having a cavity formed in the interior thereof,
    said cavity having a longitudinal slope which is generally V-shaped in longitudinal profile and downwardly concave;
a movable member which is movable longitudinally along said slope within said cavity; and
a detecting means operable
    to detect the inclination of a mounting body to which said case means is attached,
        in response to longitudinal movement of said movable member along said longitudinal generally V-shaped slope;
said case means being mounted on a circuit board supporting electrical equipment of a vehicle body which vehicle body comprises said mounting body;
said longitudinal slope having a downwardly facing, curved apex defining
    an inflection point for imparting hysteresis to the longitudinal movement of said movable member; and
said detecting portion comprised non-contacting sensing means operable to detect the longitudinal movement of said movable member while remaining free of direct contact therewith.

2. An inclination sensor comprising:
case means having a cavity formed in the interior thereof,
    said cavity having a longitudinal slope which is generally V-shaped in longitudinal profile downwardly concave, and having a downwardly facing apex;
a movable member which is movable longitudinally along said slope within said cavity;
detecting means operable
    to detect the inclination of a mounting body to which said case means is attached,
        in response to longitudinal movement of said movable member along said longitudinal generally V-shaped slope; and
restricting means provided by said apex and operable to impede movement of said movable member out of said apex only until said case means undergoes a predetermined, longitudinal tilting movement;
said case means being mounted on a circuit board supporting electrical equipment of a vehicle body which vehicle body comprises said mounting body; and
said downwardly facing apex being curved and defining an inflection point for imparting hysteresis to the longitudinal movement of said movable member.

3. An inclination sensor comprising:
case means having a cavity formed in the interior thereof,
    said cavity having a longitudinal slope which is generally V-shaped in longitudinal profile downwardly concave, and having a downwardly facing apex;
a movable member which is movable longitudinally along said slope within said cavity;
a detecting means operable
    to detect the inclination of a mounting body to which said case means is attached,
        in response to longitudinal movement of said movable member along said longitudinal generally V-shaped slope; and
restricting means provided by said apex and operable to impede movement of said movable member out of said apex only until said case means undergoes a predetermined, longitudinal tilting movement;
said case means being mounted on a circuit board supporting electrical equipment of a vehicle body which vehicle body comprises said mounting body;
said downwardly facing apex being curved and defining an inflection point for imparting hysteresis to the longitudinal movement of said movable member; and
said detecting means comprises non-contacting sensing means operable to detect the longitudinal movement of said movable member while remaining free of direct contact therewith.

4. An inclination sensor comprising:
case means having a cavity formed in the interior thereof,
    said cavity having a longitudinal slope which is generally V-shaped in longitudinal profile and downwardly concave;
a movable member which is movable longitudinally along said slope within said cavity; and
a detecting means operable
    to detect the inclination of a mounting body to which said case means is attached,
        in response to longitudinal movement of said movable member along said longitudinal generally V-shaped slope;
said case means being mounted on a circuit board supporting electrical equipment of a vehicle body, which vehicle body comprises said mounting body.

5. An inclination sensor comprising:
case means having a cavity formed in the interior thereof,
    said cavity having a longitudinal slope which is generally V-shaped in longitudinal profile and downwardly concave;
a movable member which is movable longitudinally along said slope within said cavity; and
a detecting means operable
    to detect the inclination of a mounting body to which said case means is attached, in response to longitudinal movement of said movable member along said longitudinal generally V-shaped slope;
said case means being mounted on a circuit board supporting electrical equipment of a vehicle body which vehicle body comprises said mounting body; and
said longitudinal slope having a downwardly facing, curved apex defining
    an inflection point for imparting hysteresis to the longitudinal movement of said movable member.

* * * * *